Dec. 9, 1958    A. W. HAYDON ET AL    2,863,281
RESETTABLE DRIVE MECHANISM FOR POTENTIOMETER OR THE LIKE
Filed Jan. 31, 1956    2 Sheets-Sheet 1
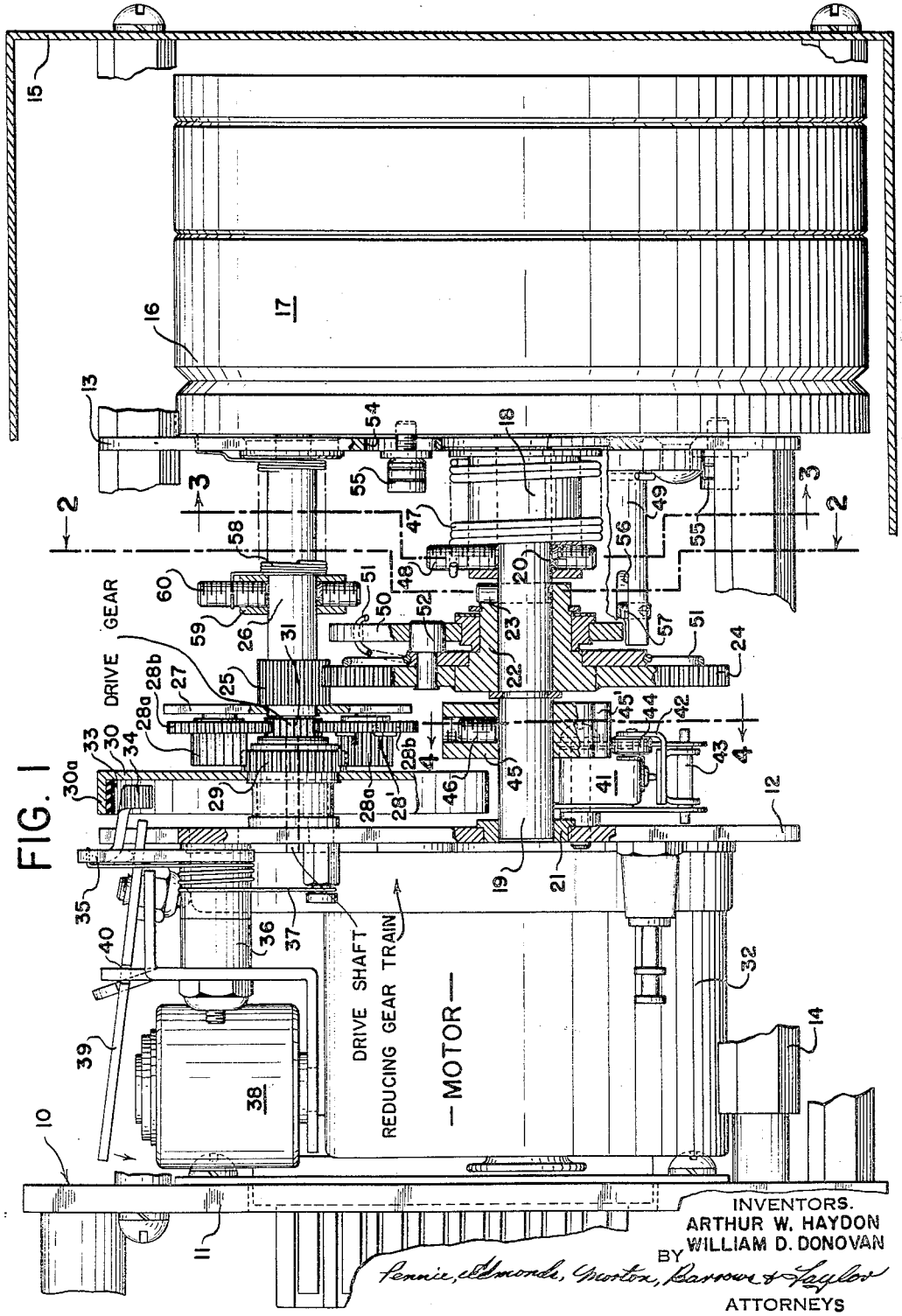
INVENTORS.
ARTHUR W. HAYDON
WILLIAM D. DONOVAN
BY
ATTORNEYS Dec. 9, 1958  A. W. HAYDON ET AL  2,863,281
RESETTABLE DRIVE MECHANISM FOR POTENTIOMETER OR THE LIKE
Filed Jan. 31, 1956  2 Sheets-Sheet 2
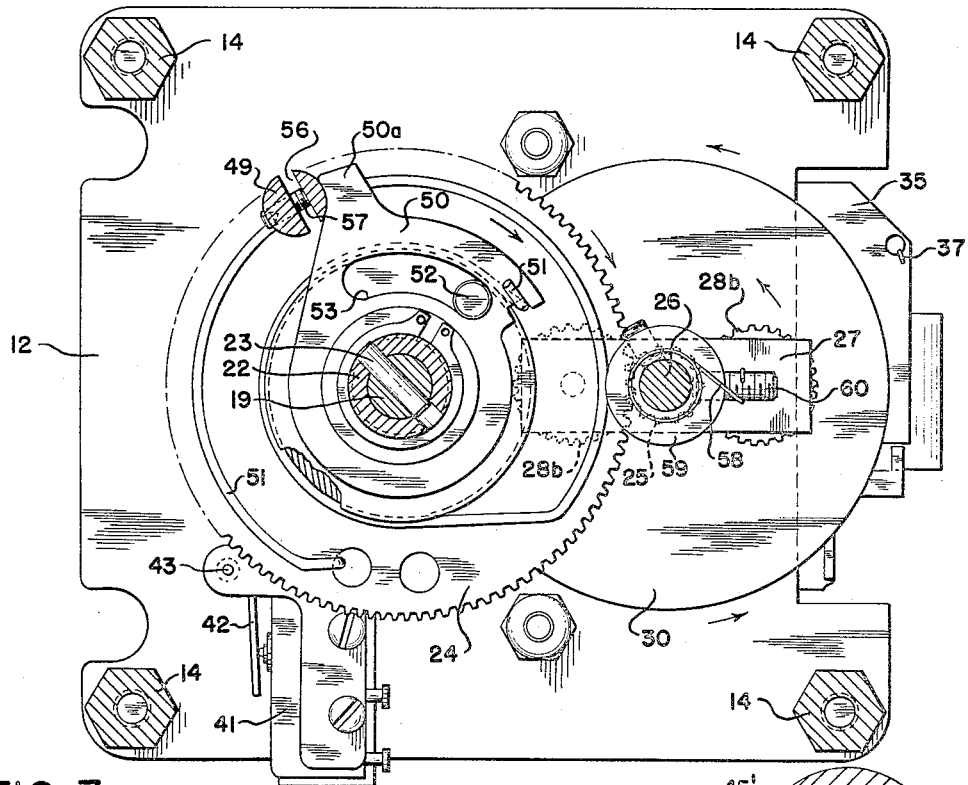
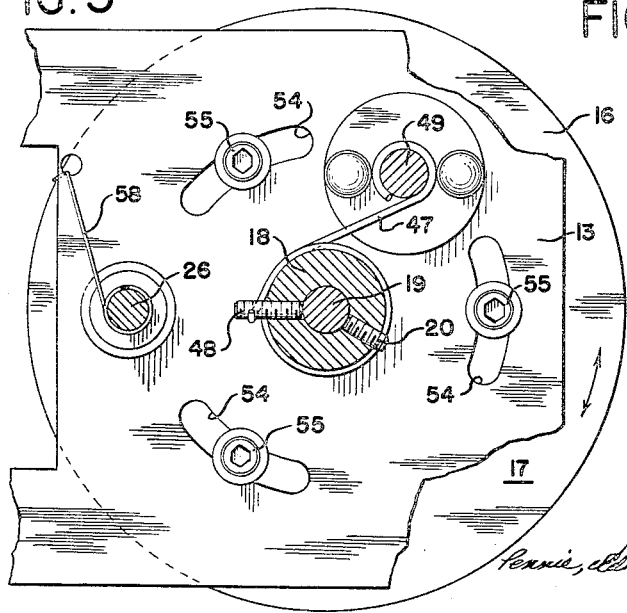
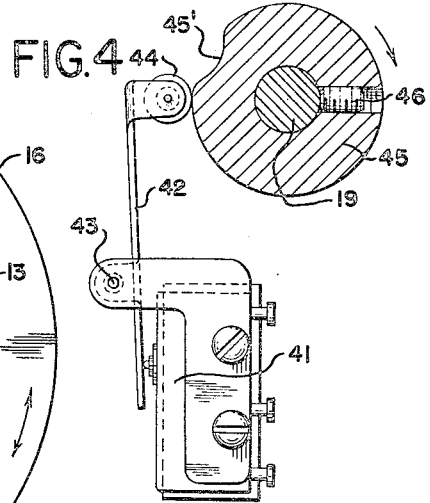
INVENTORS.
ARTHUR W. HAYDON
WILLIAM D. DONOVAN
ATTORNEYS United States Patent Office 2,863,281
Patented Dec. 9, 1958

2,863,281

RESETTABLE DRIVE MECHANISM FOR POTENTIOMETER OR THE LIKE

Arthur W. Haydon, Milford, and William D. Donovan, Waterbury, Conn., assignors to Consolidated Electronics Industries Corp., New York, N. Y., a corporation of Delaware Application January 31, 1956, Serial No. 562,396

10 Claims. (Cl. 60—7)

The present invention relates to control devices, and more particularly to an improved precision control instrumentality comprising an adjustable control element and a power driving mechanism therefor.

For certain purposes, the details of which are not here important, a control element having a range or cycle of control settings, through which it may be adjusted, must be so adjusted with accuracy and precision with respect to time. Thus, for example, for certain applications, it is necessary to adjust a potentiometer through a range of adjustment to connect a progressively greater resistance in an electrical circuit, and the adjustment must be accurate and precise in relation to time. Moreover, it may be necessary to operate the potentiometer or other control device through such a range or cycle of adjustments repeatedly and at frequent intervals, so that rapid and accurate resetting of the potentiometer is an important consideration. Accordingly, this invention has as its principal object the provision of an improved mechanism for effecting the adjustment of a control element in the manner above described.

More specifically, the invention seeks to provide an improved mechanism for controlling a potentiometer in such manner that the effective circuit resistance thereof may be adjusted with accuracy and precision with respect to time, and in such manner that the cycle of adjustment may be quickly repeated where necessary.

One of the improved features of the new device resides in a novel and improved arrangement for resetting the potentiometer and drive mechanism at the end of an adjusting period, to ready the apparatus for a repeat operation. In this respect, the invention provides a novel structure or mechanism for isolating shock forces from delicately adjusted parts of the device, permitting a rapid return movement of the parts to a precisely adjusted starting point in repeated operations.

Another improved feature of the invention resides in the provision of improved arrangements for adjusting a potentiometer or other control device in relation to the drive mechanism therefor, so that the desired initial setting of the control element may be made in a precise manner. To this end, provisions are made for adjustably mounting the body of the control element on a frame. In addition, further means are provided for adjusting, in a limited but highly precise manner, the initial orientation of the movable member of the control element. The arrangement is such that an initial or rough adjustment may be made by positioning the control element in the desired manner on the frame, after which a further or fine adjustment may be effected to obtain the desired precise initial setting.

In the device of the present invention, it is contemplated that the drive mechanism will include one or more gear trains, and it is a more specific object of the invention to provide improved arrangements for preventing or minimizing backlash between certain mating gears of the mechanism.

The above and other objects and advantages of the invention will become apparent upon consideration of the following description, making reference to the accompanying drawing, in which—

Fig. 1 is a side elevation, partly in section and with parts broken away, of a control device incorporating the improved features of the invention; and Figs. 2 through 4 are sectional views taken along lines 2—2, 3—3, and 4—4, respectively, of Fig. 1.

Referring first to Fig. 1, the numeral 10 designates generally a frame comprised of a base plate 11, intermediate plate 12, and end plate 13, the several plates being secured together in spaced relation by means of spacer bolts 14. A cover 15 encloses the entire frame for the protection of the mechanism contained therein.

Secured to the outer face of the end plate 13 is the body portion 16 of a potentiometer 17. The potentiometer 17, which in itself may be of conventional design, has a rotatable control member or shaft 19, by means of which the effective resistance of the potentiometer may be varied. The control member or shaft 19 extends through an opening in the end plate 13 across the space between the intermediate and end plates 13 and 12 where it is rotatably received within a bushing 21. A collar 18 is secured at one end on the control shaft 19, by means of set screws 20. Near its center portion, the control shaft 19 carries a sleeve 22, which is affixed to the shaft by means of a pin 23. The sleeve 22 mounts a relatively large spur gear 24 arranged to mesh with a relatively small diameter pinion 25. The pinion 25 is secured to a drive shaft 26 journaled in the frame, so that, when the shaft 26 is rotated, the pinion 25 drives the large spur gear 24, thereby rotating the control shaft 19.

The mechanism for rotating the drive shaft 26 is fully described and claimed in the copending application of John H. Coulombe et al., Serial No. 506,876, filed May 9, 1955, now Patent No. 2,826,650, issued March 11, 1958, and assigned to the same assignee as is this invention, and, therefore, will be only briefly described with reference to the present invention. Thus, at the left of the pinion 25, the drive shaft 26 carries a pair of arms 27 which, in turn, carry a pair of differential gears 28a—28b. The smaller pinions 28a of the differential gears mesh with a common gear 29 carried by a large diameter drum 30, in coaxial relation with the drive shaft 26. The larger pinions 28b of the differential gears mesh with a common gear 31, which is also coaxial with the drive shaft 26 and is adapted to rotate independently of both the drive shaft 26 and the gear 29. One of the differential gear sets 28a—28b has a spring 28', one end of which engages the small pinion 28a of the set, and the other end of which engages the larger pinion 28b. The spring 28' tends to rotate the two pinions relative to each other, thereby keeping the teeth of the pinions 28a and 28b in tight engagement with their respective mating gears 29 and 31. This avoids backlash or looseness between the gears in question.

By means of an arrangement more clearly illustrated in the before-mentioned copending application, the pinion 31 is driven by means of a constant speed motor 32 mounted between the base and intermediate plates 11 and 12.

As illustrated in Fig. 1, the drum 30 has a flange 30a which is directed toward the intermediate plate 12 of the frame. On the inner surface of flange 30a, there is bonded a lining 33 of rubber or other suitable friction material. A brake shoe 34, mounted on an arm 35, is normally positioned in closely spaced relation to the friction lining 33 and is adapted to be moved into engagement with the lining to prevent rotation of the drum 30.

When the drum 30 is held against rotation by the brake shoe 34, the gear mechanism comprised of parts 27, 28a–28b, 29, and 31 constitutes an epicyclic gear train. Thus, rotation of the pinion 31, by means of the drive motor 32, tends to rotate the larger pinions 28b of the differential gears 28a–28b about their respective axes. Since the gear 29 is held against rotation by the drum 30, the differential gears 28a–28b will be caused to advance through their orbital path, about the axis of drive shaft 26, by reason of the engagement between the gear 29 and the smaller pinions 28a of the differential gears. This causes the arms 27, and hence the drive shaft 26, to rotate in a direction opposite to that in which the drive pinion 31 rotates. Rotation of the pinion 25 causes the control shaft 19 of the potentiometer to be rotated, as heretofore explained.

When the brake shoe 34 is out of engagement with the friction lining 33, the drum 30 and gear 29 are free to rotate. Accordingly, rotation of the drive pinion 31 causes the differential gears 28a–28b to rotate about their respective axes, and this in turn rotates the pinion 29. Since the pinion 29 rotates freely at this time, the arms 27 will remain stationary and no movement of the control member 18 will be effected.

The arm 35, which supports the brake shoe 34, is pivotally mounted on the intermediate frame plate 12 by means of a post 36 which is parallel to, but offset from, the axis of the drum 30. A spring 37 acts against the arm 35 to urge the latter away from the friction lining 33 carried on the inside of the drum. For moving the shoe 34 into braking contact at desired times, a solenoid coil 38 is mounted between the base and intermediate frame plates 11 and 12. An armature bar 39 for the coil 38 is pivotally mounted in the frame at 40 and has one end underlying a portion of the brake arm 35 and its other end overlying the core of the solenoid coil 38. When the coil 38 is energized, the left end of the armature bar 39 is drawn downwardly, causing the brake arm 35 and shoe 34 to be raised into braking position. When the coil 38 is subsequently deenergized, the spring 37 returns the brake shoe 34 to its initial position.

Immediately prior to the start of a control operation, the solenoid coil 38 will be in a de-energized condition, and the motor 32 may be either energized or de-energized, as desired. To start an operation, a switch, not shown, is closed to energize the coil 38, and to start the motor 32 if necessary. Through the gear mechanism heretofore described, the control shaft 19 is caused to rotate at a predetermined speed, progressively changing the setting of potentiometer 17. When it has been rotated to the desired extent and hence the potentiometer moved through the desired cycle of adjustments, a switch 41 is actuated. The switch 41, which is connected, by means not shown, in the circuit of the coil 38 and in the circuit of the motor 32 if desired, may be of a conventional normally-open type, and is normally held closed (see Fig. 4), by means of a lever 42, pivoted at 43 on the switch casing, and having a follower roll 44 at its free end. The follower roll 44 is arranged to engage a cam 45 secured to the control shaft 19 by means of set screws 46. Hence, cam 45 rotates simultaneously with the control shaft 19, so that the operation of the switch 41 is accurately related to the adjustment of the potentiometer 17.

During the driving of the control shaft to adjust the potentiometer, cam follower 44 will ride on the rise of the cam and switch 41 will be maintained closed. When the cam has been turned sufficiently, however, cam follower 44 will enter dwell 45' and the switch 41 will be permitted to open. Thus, at the end of the control operation, when the switch 41 is permitted to open, the solenoid coil 38 is de-energized, as is the motor 32 in desired cases. This frees the drum 30 for rotation, and thus permits the drive shaft 26 to rotate independently of any rotation of the drive pinion 31. At this time, it is desirable to quickly return the apparatus to its initial or starting position, and, for this purpose, a spring 47 is connected at one end to the collar 18, by means of set screws 48, and is connected at its other end in fixed relation to the frame. The spring 47 is arranged to continuously apply a torque to the collar 18 (by adjustment of collar 18 on shaft 19 this torque may be varied) and thus to control shaft 19 tending to rotate the latter in a return direction. Thus, at the end of a control operation, when the drum 30 is released, the spring 47 will rapidly rotate the control shaft 19 toward its starting position.

In order to properly position the control shaft 19 at the desired starting point at the end of each operation, a stop post 49 (Fig. 2) is secured to the end plate 13 of the frame and extends in parallel relation to the control shaft. The stop post 49 is adapted to be engaged by a stop arm 50, which is rotatably mounted on the sleeve 22 surrounding the control shaft 19. In accordance with the teachings of the invention, the stop arm 50 is connected to the large diameter spur gear 24 by means of a shock absorbing spring 51, which urges the stop arm 50 to rotate with respect to the gear 24 in a return direction, that is, in the same direction the control shaft 19 rotates when returning to its initial position. By means of a pin 52, secured in the gear 24 and extending through an arcuate slot 53 in the stop arm, rotation of the latter member with respect to the gear 24 in a return direction is limited, and normally the spring 51 will retain the stop arm 50 in its limit position, as illustrated in Fig. 2.

When the control shaft 19 is rapidly returned at the end of a control operation by return spring 47, gear 24 and stop arm 50, by reason of its interconnection therewith by spring 51, it will be rotated along with the control member. As the control shaft reaches its initial position, a projecting portion 50a of the stop arm engages the stop pin 49, and further return movement of the stop arm 50 is thereby prevented. Considerable kinetic energy will, of course, have been developed in the rotating parts during this rapid return movement, and to absorb this energy the gear 24, shaft 19, and control member 18 may continue to rotate against the action of the shock spring 51. During the overtravel movement of the last-mentioned parts, the pin 52 moves within the arcuate slot 53 of the stop arm 50, in a counterclockwise direction as seen in Fig. 2, slot 53 being of such length that the pin 52 does not reach the end of the slot under normal conditions.

In accordance with the teachings of the invention, the shock spring 51 is of greater effective force than the return spring 47, so that, after the kinetic energy of the rotating parts has been absorbed, the spring 51 will rotate the gear, shaft, and control member in an opposite direction until the pin 52 engages the end of the slot 53 as seen in Fig. 2. At this time, the control shaft 19 will be in its exact starting position.

In order to adjust the potentiometer 17, so that the same will have the desired effective resistance when the control shaft 19 is in starting position, the end plate 13 of the frame is provided with a plurality of circumferentially spaced arcuate slots 54, in which are received a like plurality of bolts 55 engaging the body member 16 of the potentiometer. The slots 54 permit a limited rotation of the potentiometer body 16 with respect to the frame end plate 13, and since the stop post 49 is fixed on the frame end plate 13, such rotation of the body 16 will have the effect of altering the relation of the body 16 to the control shaft 19 when the latter is in starting position. Mounting of the potentiometer in the manner described provides for a substantial range of adjustments to accommodate anticipated manufacturing variations. However, as will be understood, an adjustment of this type is difficult to effect with extreme precision. Accordingly, a further adjustment is provided, which may be considered a fine adjustment. To this end, the stop post 49 is provided with a longitudinal slot 56 and is drilled and tapped at one side to receive a set screw 57. As shown in Figs. 1 and 2, the end of set screw 57 extends through the longitudinal slot 56 and bears against one side of the post 49. Thus, by properly adjusting the set screw 57, the slotted portion of the post 49 may be deformed slightly, so that the stop arm 50 engages the post 49 at an earlier or later point in its return movement.

Generally, adjustments of the potentiometer 17 are made during assembly of the device, and are carried out by first tightening the bolts 55 to lock the body to the frame in approximate adjustment, after which the set screw 57 is manipulated until the exact effective resistance is indicated by suitable instruments.

In a precise control device of the type herein concerned, it is desirable to avoid backlash or looseness in the gears wherever possible, certain provisions to this end being described in the before-mentioned copending application of John H. Coulombe et al. The device of the present invention incorporates further novel means for this purpose, having particular reference to the limitation of backlash between the pinion 25 and the main spur gear 24. In the illustrated device, as the motor 32 drives the control member 18 for a timing and control operation, the drive shaft 26 will rotate in a counterclockwise direction, viewing the device from the potentiometer end. Thus, it is desirable to urge the pinion 25 at all times in a counterclockwise direction, so that its teeth are maintained in driving engagement with the teeth of the main spur gear 24. For this purpose, a spring 58 is attached to the frame plate 13, wound in a clockwise direction about the drive shaft 26, and connected to the latter through a collar 59 and set screw 60. The arrangement is such that the spring 58 tends at all times to urge the shaft 26 in a counterclockwise rotary direction.

One of the advantageous features of the above-described anti-backlash arrangement is that the spring 58 is partially unwound during the timing period, when the control shaft 19 is being driven through gears 25 and 24. By this arrangement, the auxiliary tooth pressure provided by the anti-backlash spring 58 is progressively decreased during the timing period, as the back pressure supplied by the main return spring progressively increases. And, of course, the reverse is true during return movements of the parts.

One of the important advantages of the new device resides in the novel arrangement for absorbing the kinetic energy of the moving parts when the device is returned to its initial condition at the end of a control operation. This is accomplished by providing the stop member, which is resiliently urged in the direction of the return rotation of the control shaft 19 by the anti-shock spring which is of greater effective force than the return spring. This permits a slight over-travel of certain of the rotating parts at the end of a return movement, after which the parts are brought into accurate reference to their starting positions. As will be readily apparent, this arrangement provides for the maintenance of precision adjustments throughout repeated operations of the device.

Another novel and advantageous feature of the new device is the efficient arrangement for adjustably mounting the potentiometer body 16 for initially effecting a rough adjustment of effective potentiometer resistance, in combination with the accurately adjustable stop post 49, by means of which the initial effective resistance of the potentiometer may be finely adjusted with extreme precision.

In its application hereinbefore described, the new device is employed in combination with the potentiometer in a circuit, in which it is desired to progressively increase the effective value of the circuit resistance. Thus, upon the closing of a control switch, the solenoid coil 38 and drive motor 32 will be energized to cause the control shaft 19 to rotate with respect to the potentiometer body 16. Rotation of the control shaft 19 progresses at an accurately controlled rate, determined by the speed of the motor 32, and this progressively increases the effective circuit resistance of the potentiometer 17 in the manner desired. When the resistance reaches a predetermined maximum value, the cam 45 permits opening of the switch 41. When the switch 41 opens, the solenoid coil 38 is de-energized, and the parts are returned to their starting positions by means of the spring 47. Where desired, the motor 32 is also de-energized upon actuation of switch 41.

It should be understood that the suggested use of the new device, as set forth above, is intended to be illustrative only and is not intended in any way to limit the invention. Reference should, therefore, be made to the following claims for a determination of the full scope of the invention.

We claim:

1. In a precision control device of the type including a control element having a rotatable control member, a drive motor, and a gear train connecting the drive motor and control member, the combination of a return spring for forcibly returning the control member to an initial position, a stop arm rotatably connected to the control member, a shock spring connecting said stop arm and control member and tending to rotate the stop arm with respect to the control member in the direction of return movement of the control member, means to limit relative rotation between the stop arm and control member in the said direction, and means for limiting rotation of the stop arm in said direction, the shock spring exerting greater effective force than the return spring whereby the stop arm will normally be held in its limit position and the control member in its limit position relative thereto while the control member may temporarily override the stop member at the end of a return movement to absorb the kinetic energy of the returning parts.

2. The device of claim 1 characterized by the control member comprising a shaft, the gear train including a spur gear secured to the shaft and having a pin extending axially therefrom, the stop arm being rotatable with respect to the gear and having an arcuate slot therein for the reception of the pin, and the shock spring being secured at one end to the gear and at its other end to the stop arm to rotate the latter in a return direction with respect to the gear, the pin and slot determining the limit of relative rotation in said direction.

3. For use in combination with a potentiometer, an adjustable rotary control member, and a drive motor drivingly connectable to the control member, a return spring urging the control member into an initial position, a fixed stop for limiting the return movement of the control member at its initial position, a stop engaging member movably mounted on the control member, a shock spring urging the stop engaging member toward the stop, the shock spring being of greater effective force than the return spring, and means to limit the movement of the stop engaging member with respect to the control member under the force of the shock spring.

4. In a precision control device, the combination of a rotatable control member, a drive motor and gear train connected to the control member for rotating the same in a first direction, a return spring urging the control member in the opposite direction, the gear train including a driven gear in driving connection with the control member and a driving gear drivingly connected to the driven gear and to the motor, and an anti-backlash spring connected to the driving gear and urging the same to rotate in a driving direction to maintain the teeth of the respective gears in driving engagement, the anti-backlash spring being arranged to partially unwind during driving movements and to rewind during return movements of the control member.

5. The device of claim 4, characterized by the first gear being mounted in fixed relation to the control member, and further including a drive shaft mounting the second gear, the return spring acting directly upon the control member, and the anti-backlash spring acting directly upon the drive shaft.

6. The device of claim 4 characterized by the anti-backlash spring being of less effective force than the return spring.

7. For use in combination with a control element, a body portion, a rotatable control member, a frame, said body portion being secured to said frame for support thereby and said rotatable control member being journaled in said frame for rotation with respect thereof, a drive motor drivingly connectable to said control member to rotate the control member in a first direction, a return spring for rotating the control member in a return direction, a stop member affixed to the frame limiting the return movement of the control member, means adjustably securing the body of the control element to the frame, said means providing for limited rotational adjustment of the body of the control element with respect to the frame for adjusting the initial orientation of the control member and body, and means to adjust the effective relation of the stop member to the frame for further adjusting the initial orientation of the control member and body.

8. The device of claim 7 characterized by the stop member comprising a pin anchored to the frame and extending in a direction parallel to the control member, and further including a stop arm carried by the control member and engageable with a surface portion of the pin to determine a position of initial orientation for the control member, and means to adjust the said surface portion of the pin with respect to the frame.

9. The device of claim 7 characterized by said frame having a plurality of arcuate slots therein, said means adjustably securing the body of the control element to the frame comprising a plurality of bolts received in the arcuate slots and engaging the frame and body.

10. For use in combination with a potentiometer, a body portion and a rotatable control member, a frame having secured thereto and supporting said body portion, a drive motor drivingly connectable to said control member to rotate the control member in a first direction, and a return spring urging the control member in a return direction, the combination of means securing the body portion to the frame and providing for a limited rotational adjustment of the body portion relative to the frame, stop means carried in part by the frame and in part by the control member to limit the rotation of the control member in a return direction, and an adjustable member carried by the stop means and forming a part thereof to adjust the limit of rotation of the control member in a return direction.

References Cited in the file of this patent

UNITED STATES PATENTS

| | | |
|---|---|---|
| 1,964,846 | Earnshaw | July 3, 1934 |
| 2,058,561 | Broadwell | Oct. 27, 1936 |
| 2,384,536 | Crumble | Sept. 11, 1945 |
| 2,477,670 | Toth et al. | Aug. 2, 1949 |
| 2,679,167 | Nichinson | May 25, 1954 |
| 2,730,595 | Lancaster | Jan. 10, 1956 |